(12) United States Patent
Nick et al.

(10) Patent No.: US 9,456,011 B1
(45) Date of Patent: Sep. 27, 2016

(54) DYNAMIC SERVICE AND REGISTRY FOR MANAGEMENT INFRASTRUCTURE

(75) Inventors: Jeff Nick, Milford, MA (US); John D. Hushon, Medfield, MA (US); Mark Parenti, Milford, NH (US); Nihar Nanda, Acton, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1031 days.

(21) Appl. No.: 13/433,995

(22) Filed: Mar. 29, 2012

(51) Int. Cl.
*G06F 15/173* (2006.01)
*H04L 29/06* (2006.01)

(52) U.S. Cl.
CPC .................................... *H04L 65/40* (2013.01)

(58) Field of Classification Search
None
See application file for complete search history.

(56) References Cited

U.S. PATENT DOCUMENTS

| | | | |
|---|---|---|---|
| 7,349,965 B1* | 3/2008 | Graupner | G06F 17/30545 709/219 |
| 2002/0184054 A1* | 12/2002 | Cox et al. | 705/2 |
| 2003/0061067 A1* | 3/2003 | Atwal et al. | 705/1 |
| 2003/0110262 A1* | 6/2003 | Hasan | H04L 41/0213 709/226 |
| 2005/0165656 A1* | 7/2005 | Frederick et al. | 705/26 |
| 2009/0288084 A1* | 11/2009 | Astete | G06F 9/45533 718/1 |
| 2013/0151708 A1* | 6/2013 | Shelby et al. | 709/226 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — John B Walsh
(74) *Attorney, Agent, or Firm* — Ryan, Mason & Lewis, LLP

(57) ABSTRACT

Information processing techniques for managing data center configurations. In one example, a method comprises the following steps. A registry is maintained corresponding to at least one of products and services offered by a provider entity for use in providing a data center for a customer entity. A central interface is provided for presenting information maintained in the registry and for presenting one or more features operative to allow the customer entity to create and/or change a configuration of the data center. The central interface comprises one or more features for obtaining at least one of the data center products and services, one or more features for configuring the obtained one of the data center products and services, and one or more features for managing the configured one of the data center products and services. Accordingly, the customer obtains a customized data center configuration through the central interface and the registry.

18 Claims, 5 Drawing Sheets

DYNAMIC SERVICE AND REGISTRY FOR MANAGEMENT INFRASTRUCTURE

FIELD

The field relates to information processing, and more particularly to information processing techniques for managing data center configurations.

BACKGROUND

As is known, a data center is a system comprised of computing resources including, but not limited to, processing resources and storage resources. In the context of a cloud computing infrastructure, a data center is a web-based system that is dynamically configurable to meet the computing needs of a customer. Customers typically order new services and products, as well as upgrade existing services and products, in their data center by communicating with a provider of such products and services.

However, in existing data centers, the customer's data center configuration may lack the ability to perform certain convenient, or even necessary, functions. Furthermore, when a customer seeks to add new capabilities to an existing data center, this may involve installing multiple new products in various product-specific manners, as well as learning multiple user interfaces. These drawbacks lead to an inefficient and perhaps frustrating experience for the data center customers.

SUMMARY

Embodiments of the present invention provide information processing techniques for improved management of data center configurations.

In one embodiment, a method comprises the following steps. A registry is maintained corresponding to at least one of products and services offered by a provider entity for use in providing a data center for a customer entity. A central interface is provided for presenting information maintained in the registry and for presenting one or more features operative to allow the customer entity to create and/or change a configuration of the data center. The central interface also comprises one or more features for obtaining at least one of the data center products and services, one or more features for configuring the obtained one of the data center products and services, and one or more features for managing the configured one of the data center products and services. Accordingly, the customer obtains a customized data center configuration through the central interface and the registry. One or more customer-specific applications that implement at least a portion of the configuration of the data center of the customer entity may also be formed.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

In a further embodiment, a system comprises a registry and a central interface configured to perform steps of the above-described method.

Advantageously, embodiments of the data center management techniques described herein provide a common, secure registry that can advertise all available common services to a storefront (user interface), such that the customer is able to securely select and purchase the capabilities and deploy them seamlessly via the same user interface. These common services, once provisioned, transform into one or more customer-specific secure applications.

These and other features and advantages of the present invention will become more readily apparent from the accompanying drawings and the following detailed description.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "product" refers to an item or an object such as, but not limited to, one or more hardware components, one or more software components, or some combination thereof, that may be obtained from a provider entity by a customer entity for use in conjunction with a data center.

As used herein, the term "service" refers to a function or a process such as, but not limited to, one or more computing functions, one or more storage functions, or some combination thereof, that may be provided by a provider entity to a customer entity for use in conjunction with a data center.

As used herein the term "application" refers to one or more computer programs designed to perform one or more functions when executed by a computing system. By way of example only, this may include but is not limited to a database, a spreadsheet, a word processor, as well as larger applications such as an enterprise resource planning (ERP) system. In addition, an application can include one or more computer programs that perform one or more data center operations such as but not limited to backing up files, indexing files for search, managing the capacity of disks, and protecting against attacks.

Figure 1A:
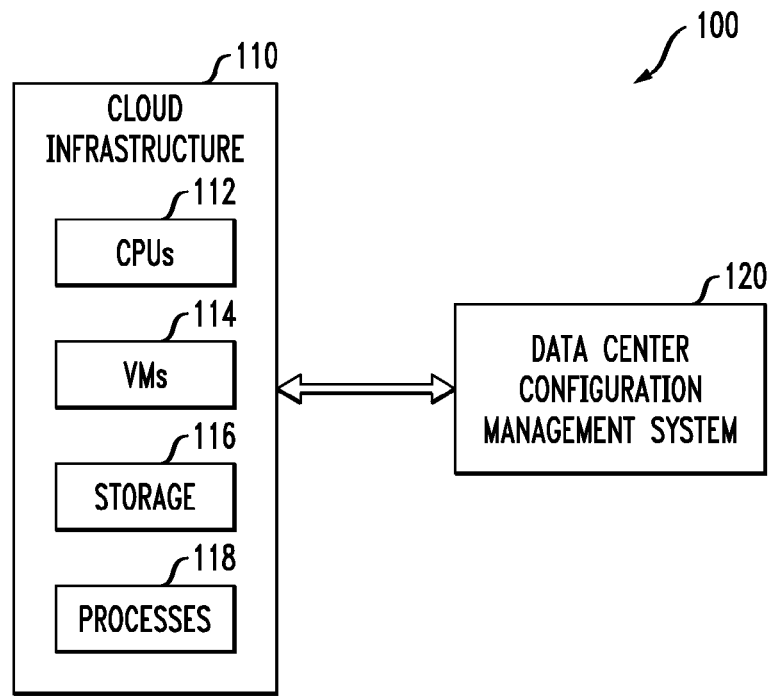
FIG. 1A shows cloud infrastructure and a data center configuration management system, in accordance with one embodiment of the invention.

FIG. 1A shows a system 100 configured in accordance with an illustrative embodiment of the present invention. The system 100 comprises cloud infrastructure 110 and a data center configuration management system 120. As will be explained in detail below, the data center configuration management system 120 manages, among other things to be described herein, data center product and service procurement, data center product and service configuration, and data center product and service administration. Cloud infrastructure 110 is illustratively depicted in the figure as comprising an execution environment with execution components comprising one or more central processing units (CPUs) 112, one or more virtual machines (VMs) 114, and one or more storage units 116. The execution components are configured to execute one or more processes 118 (e.g., computer programs, applications, etc.) that operate on one or more process input data sets that generate one or more process output data sets. A data center procured, configured and/or administered through management system 120 accesses the execution components in the cloud infrastructure 110 in order to provide the products and services associated with the data center. The cloud infrastructure 110 and the data center configuration management system 120 may be considered an example of an information processing system and/or a data storage system.

As will be described in further detail below, the data center configuration management system 120 comprises a registry of information corresponding to products and/or services offered by a provider entity for use in providing a data center for a customer entity. The system 120 also comprises a central interface for presenting the information maintained in the registry. The interface also presents one or more features operative to allow the customer entity to create and/or change a configuration of the data center. The central interface also comprises one or more features for obtaining, configuring and managing at least one of the data center products and services. Through use of the central interface in association with the registry, the customer obtains a customized data center configuration. One or more customer-specific applications (e.g., one or more service applications) that implement the configuration of the data center of the customer entity are also formed by the data center configuration management system 120.

Although the system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data center configuration management system 120 may be implemented on a second processing device of a second processing platform. It is also to be understood that a given embodiment of the system 100 may include multiple instances of the elements 110 and 120, although only single instances of such elements are shown in the system diagram for clarity and simplicity of illustration.

Figure 1B:
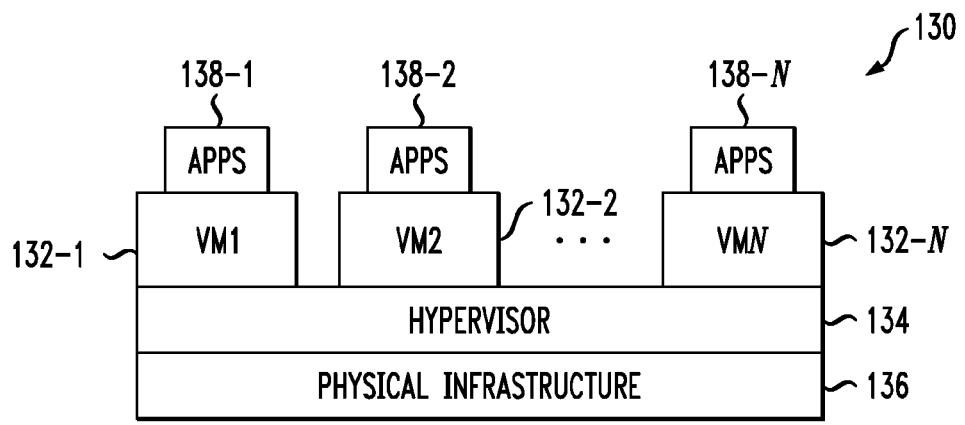
FIG. 1B shows a more detailed view of the cloud infrastructure of FIG. 1A.

As shown in FIG. 1B, a cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPU(s) 112 and/or storage units 116 in FIG. 1A). The cloud infrastructure 130 further comprises sets of applications 138-1, 138-2, . . . 138-N running on respective ones of the virtual machines 132-1, 132-2, . . . 132-N under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, and processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
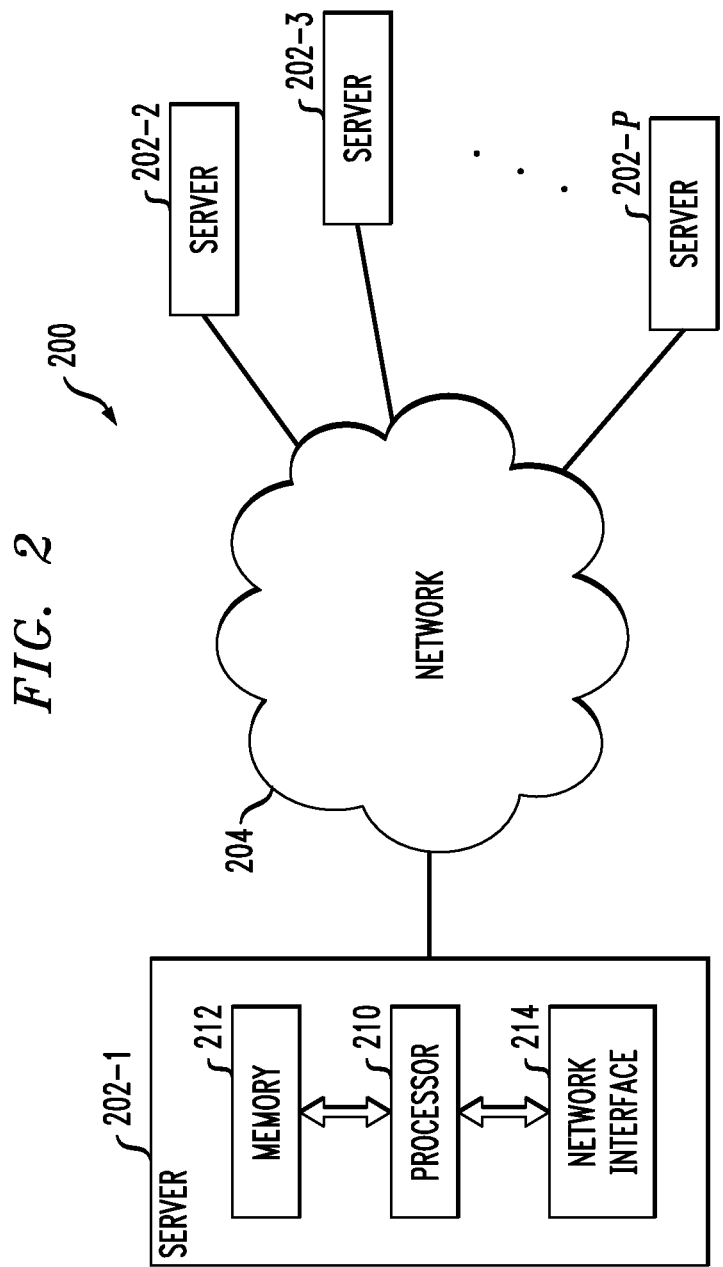
FIG. 2 shows a processing platform on which the cloud infrastructure and the data center configuration management system of FIG. 1A are implemented, in accordance with one embodiment of the invention.

An example of a processing platform on which the cloud infrastructure 110 and/or the data center configuration management module 120 of FIG. 1A may be implemented is processing platform 200 shown in FIG. 2. In one embodiment, the processing platform 200 is an information processing system. However, processing platform 200 could be a data storage system, or a combination of an information processing system and a data storage system. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 2021 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of the data center configuration management system 120 will now be described with reference to FIGS. 3 through 5.

As will be illustratively described herein, embodiments of the invention implement a common, secure registry that can advertise available common products and services of a vendor (provider entity) through an application storefront (central user interface). Thus, the customer (customer entity) is able to securely select and purchase data center capabilities (products and services) and deploy them seamlessly in a data center implementation via the same user interface. These common products and services, once provisioned, transform into one or more customer-specific secure applications (one or more service applications). The vendor (provider entity) provides these common products and services.

Figure 3:
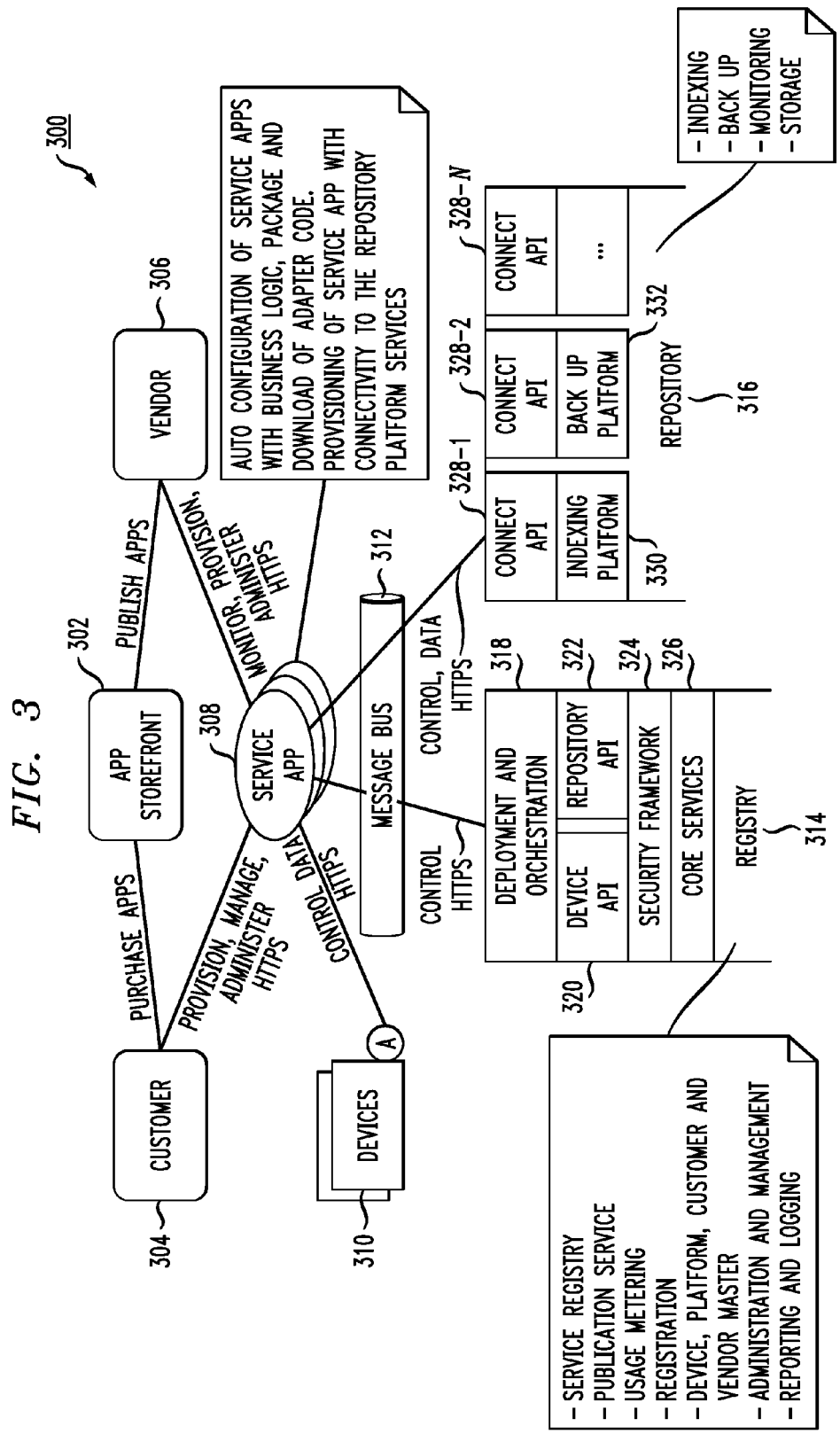
FIG. 3 shows a data center configuration management system, in accordance with one embodiment of the invention.

FIG. 3 shows a data center configuration management system 300, in accordance with one embodiment of the invention. It is to be understood that system 300 corresponds to system 120 in FIG. 1, and the products and services referred to in FIG. 3 correspond, for example, to elements available in the cloud infrastructure 110 in FIG. 1.

As shown, main components of system 300 comprise an application storefront 302, one or more service applications 308, a registry 314, and a repository 316. The registry 314 comprises a deployment and orchestration layer 318, device application programming interfaces (APIs) 320, repository APIs 322, a security framework layer 324, and core services 326. The repository 316 comprises connect APIs 328-1 through 328-N, and various platforms including indexing platform 330 and data backup platform 332.

Application storefront 302 is a graphical user interface through which a customer entity (customer) 304 accesses the data center products and services provided by a provider entity (vendor) 306. The application storefront 302 is one example of a central interface (an example of which will be described below in the context of FIG. 5). As mentioned above, the system 300 generates one or more service applications 308 which are customer-specific applications that implement at least a portion of the configuration of the data center of the customer entity.

As shown, the customer 304 purchases a service application 308, which is configured with one or more products and/or services of the vendor. The vendor then publishes the service application. The customer 304 can then, among other things, provision, manage and administer the products and/or services associated with the service application 308, while the vendor 306 can, among other things, monitor, provision and administer the products and/or services associated with the service application 308. By way of example only, provision can mean to configure the data center (e.g., allocate logical units in a data storage system). By way of further example only, monitor can mean to observe the state of the data center. Still further, by way of example only, administer can refer to one or a combination of these terms. The customer 304 and the vendor 306 can communicate with the service application 308 through various network communications protocols such as, by way of example, the HyperText Transfer Protocol (HTTP). Each service application 308 is packaged with a normalized interface to the message bus 312, allowing it to interoperate with multiple platforms (products/services) placed in the repository 316.

Thus, FIG. 3 depicts a high-level view of the deployment of the application 308 purchased by a customer 304. Vendor 306 is the entity who is selling data center applications to the customer and may be supporting the customer's data center in administration. For example, assume in a use case that the vendor is EMC Corporation, so the customer might be an entity who purchased a VNXe appliance (e.g., 310 in FIG. 3) from EMC. The storefront 302 is a central interface where one or more applications can be purchased from a data center marketplace. Assume further that a cloud infrastructure hosted by EMC runs the customer applications, the registry 314 (e.g., place to store application templates, customer records, vendor records), and the repository 316

(e.g., external data center services available over the protected cloud (private cloud) environment).

The message bus 312 provides for asynchronous transfer of messages between different components in the system.

A common security model (part of security framework 324) utilized in the cloud environment ensures multi-tenant separation, common authentication and authorization, and data protection.

Connect APIs 328-1 through 328-N virtualize access to the platforms 330, 332 of the repository 316 making them accessible and reachable from the cloud layer. For example, an indexing platform 330 (e.g., Kazeon™ from EMC Corporation) can be invoked to index new files from a customer application running in the cloud infrastructure that is unaware of physical location, infrastructure version and custom API. As an indexing request is received, it is resolved at the registry 314 locating the best repository service to which to route the request. An abstraction layer below isolates the actual service provider from the requester.

In one embodiment, registry 314 has two main functions: (1) holds the recipe to create a new application in the cloud and deploy automatically for the entire cloud infrastructure; and (2) validates and authorizes requests.

Thus, with the first main function, the registry has the recipe to put together a custom application for the customer order. To do this, the registry 314 has application templates which comprise a set of APIs 320 for customer devices running the application, APIs 322 for the repository services to be used, security method 324 with certificates to identify an application to a customer and a vendor, and automated configuration scripts to configure the network, servers, and storage. The registry 314 also implements an automated process to deploy the application in the cloud infrastructure.

In the second main function, once a virtual machine (VM) is deployed, the registry 314 provides the service (e.g., as part of core services 326) to authorize the access of a request since the registry stores the customer and vendor information. Registry 314 thus serves as a quick look up database containing customer information, purchased applications, associated vendors, authentication to repositories, attached devices, and support vendors. Each request goes through the registry look up to collect identifiers and locations, and to perform authorization and authentication to execute a request.

Thus, in one embodiment, the registry 314 includes functions including but not limited to a registration service, a publication service, a usage metering service, a device, platform, customer and vendor master service, administration and management services, and reporting and logging services. The deployment and orchestration layer 318 of the repository 314 communicates with the message bus 312.

Note further that the message bus 312 sends control messages back and forth between the service application 308, the device 310, the registry 314 and the repository 316. For example, a control message contains a noun, a verb and a payload. The verbs are action items such as PUT, GET, FIND, while the nouns describe the action to be performed, e.g., NEWFILEINDEX, and the payload contains references in forms of URIs (uniform resource identifiers) giving access to the actual data plus authentication tokens to execute the operation.

Advantageously, the customer 304 is able to deploy products and/or services that are customized specifically for them on a per-customer basis and that may be based on intelligent assistance from the registry 314. Furthermore, complex licensing issues that often arise in a customer's own implementation of a data center are now transparent from the perspective of the customer and absorbed by the cost of the service. The data center configuration management system also provides knowledge of license and authority of the services being operated, performs secure information exchange and rights-enabled isolation of customer information sets.

Figure 4:
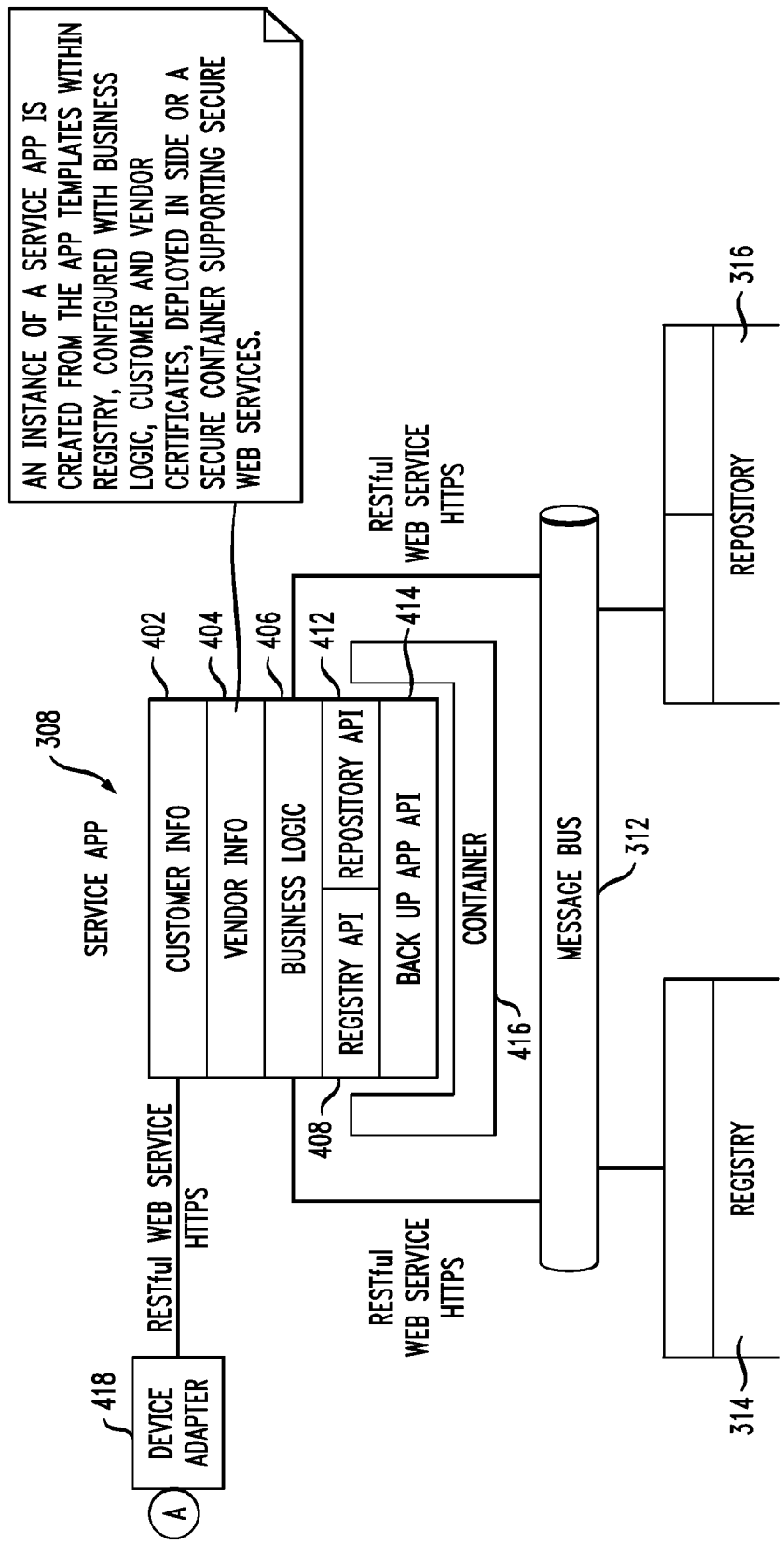
FIG. 4 shows a more detailed view of a customer-specific application formed in a data center configuration management system, in accordance with one embodiment of the invention.

FIG. 4 shows a more detailed view of a service application 308 of FIG. 3. As mentioned above, the service application 308 is created from one or more application templates in registry 314. The service application is configured with customer information 402, vendor information 404, business logic 406, a registry API 408, a repository API 412, and a data backup application API 414. The customer information 402 comprises a customer certificate and the vendor information 404 comprises a vendor certificate. The service application components 402 through 414 are contained within a secure container 416.

In one embodiment, the container 416 supports secure web services. Thus, as shown, the business logic 406 of the service application 308 communicates with the registry 314 and repository 316 over the message bus 312 using RESTful web service HTTP. The service application 308 communicates with a device adapter 418 (e.g., an interface used by device 310 in FIG. 3) in the same manner. As is known, REST stands for Representational State Transfer which is a software architecture for distributed hypermedia systems such as the World Wide Web. RESTful refers to a web service implemented using HTTP and the principles of REST.

Figure 5:
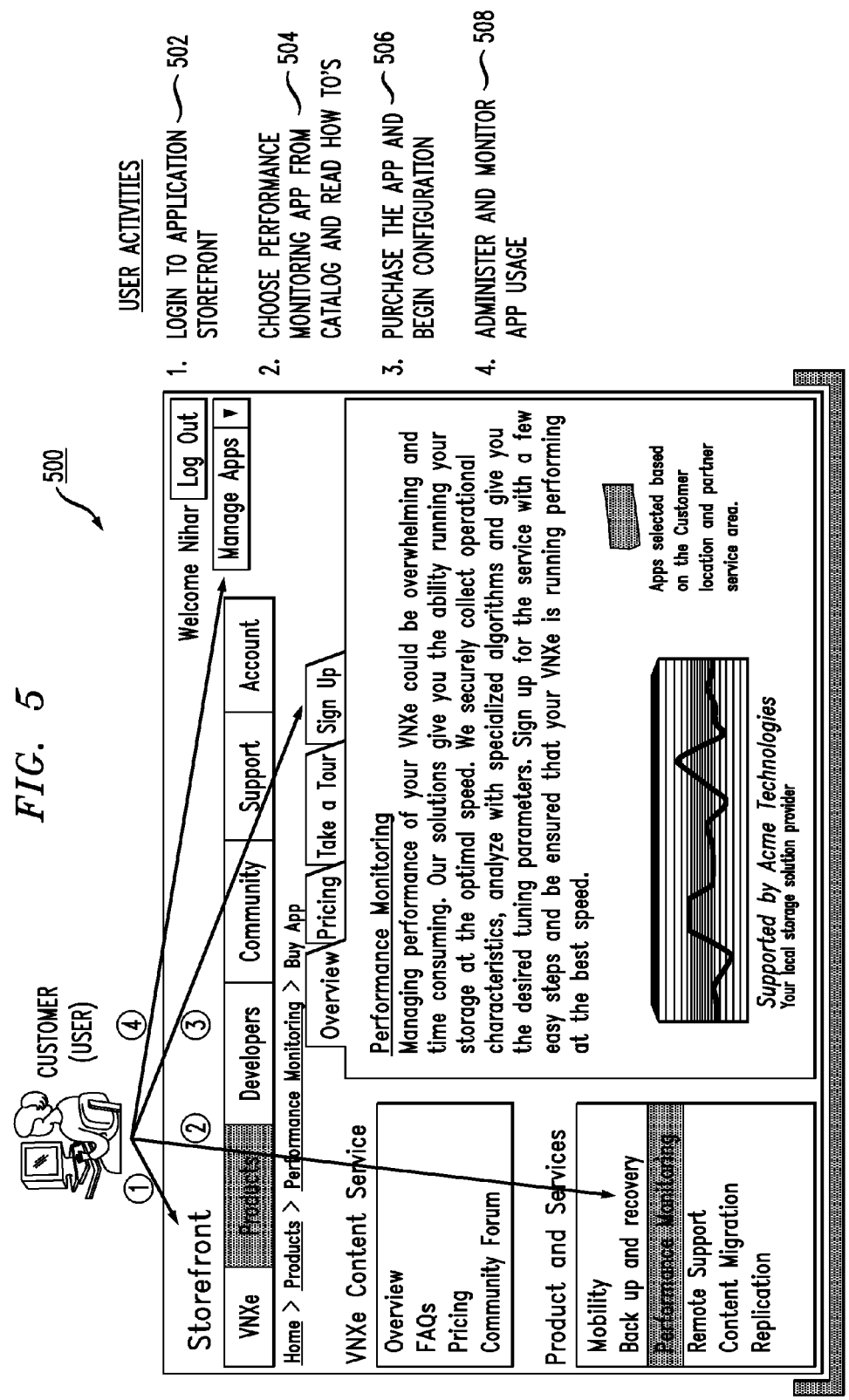
FIG. 5 shows a more detailed view of a central interface of a data center configuration management system and an example use case, in accordance with one embodiment of the invention.

FIG. 5 shows a more detailed view of a central interface of a data center configuration management system and an example use case, in accordance with one embodiment of the invention. This example highlights the ease with which customers can order and deploy services using the data center configuration management system described herein. It is to be understood that central interface 500 in FIG. 5 corresponds to the application storefront 302 in FIG. 3.

As shown, a customer (user) first logs in to the application storefront in step 502. This may be done with a typical log in process (e.g., username, password, etc.).

In step 504, it is assumed that the customer chooses a performance monitoring application from a catalog feature on the interface. The customer may also read an online use script (how-to manual).

In step 506, it is assumed that the customer purchases the performance monitoring application and begins to configure it. For example, the performance monitoring software comes with default settings. Configuring, in this example, means that these default settings are modified or customized. Selection of the application is achieved by the customer clicking on the "performace monitoring" link (feature) in the interface 500.

In step 508, the customer administers and monitors the application usage. An administrative interface (not shown) is provided to set/edit options and settings for software customization and view usage patterns of the application.

By way of further example, assume that a customer using a network-attached storage (NAS) service wishes to add deduplication (dedup) and search/index capabilities. The customer selects dedup and search/index services from the storefront (central interface 500), which results in a secure, customer-specific deployment of two new service applications (e.g., that leverage Kazeon™ and DataDomain™ technologies, both commercially available from EMC Corporation of Hopkinton, Mass.). The service application(s) (308 in FIG. 3) seamlessly integrates with the message bus (312 in FIG. 3) and inserts the business logic (406 in FIG.

4) of the two new capabilities into the existing NAS services via downloaded adapters (418 in FIG. 4) that can integrate to the existing NAS service.

Advantageously, in accordance with embodiments of the invention, customers now have a common way to purchase new data center capabilities and seamlessly add them into the data center. Further, they now have an online catalog of products and services from which they can choose. Vendor products and services can now seamlessly be installed and effectively interoperate with any products/services at the customer data center. Further, such products and services can now be managed with a common user interface. Still further, products and services offered by a vendor can now be offered seamlessly to multiple customers that wish to use them for their data center. In accordance with embodiments of the invention described herein, there is now a standard way of measuring usage of service applications deployed into multiple customer data centers, thereby allowing a data center provider to bill a customer based on service usage of any generic service offering.

Furthermore, embodiments of the invention provide a combined cloud based/web-based and premises-based infrastructure which facilitates the connection of service offerings and service recipients. Services can range from simple diagnostic services to full data mobility services. This is achieved in a secure infrastructure including a registry, a repository, a service (message) bus and a commerce portal (central interface). Accordingly, such dynamic services offering enables customers to seamlessly order, install, configure, and integrate additional products/services into their data centers, as well as seamlessly add new tenants and mobile users into their data centers.

Still further, embodiments of the invention realize that, in complex environments, the understanding of the relationships between one application/service and other applications/services is complex. Accordingly, the data center configuration management system described herein and, in particular, the registry component (314 in FIG. 3) supports intelligent recommendation to the customer entity with respect to data center products/services including functions and parameters associated with such products/services. Advantageously, in one or more embodiments, such intelligent recommendation by the registry is accomplished by an introspection of local system sensors, a model driven configuration optimization, and continuous administration of the system configuration and associated data center assets.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
maintaining a registry corresponding to at least one of products and services offered by a cloud provider entity for use in providing a data center for a customer entity, the data center comprising a plurality of cloud computing resources connected over a network;
providing a central interface for presenting information maintained in the registry and for presenting one or more features operative to allow the customer entity to at least one of create and change a configuration of the data center;
wherein the customer entity, through the central interface, is enabled to: obtain at least one of the data center products and services, configure the obtained one of the data center products and services, and manage the configured one of the data center products and services, such that the customer obtains a customized data center configuration through the central interface and the registry;
forming a customer-specific application that implements at least a portion of the configuration of the data center of the customer entity, wherein the customer-specific application is configured with logic specific to the customer entity, wherein the registry comprises one or more application templates each comprising at least one application programming interface for one or more customer devices running the customer-specific application, wherein forming the customer-specific application comprises employing the one or more application templates, and wherein the customer-specific application is automatically deployed by the registry; and
integrating the customer-specific application with one or more other data center products and services that exist in the configuration of the data center of the customer entity;
wherein the integrating comprises inserting the logic into the existing one or more other data center products and services; and
wherein the steps are performed by at least one processing device comprising a processor coupled to a memory.

2. The method of claim 1, wherein obtaining at least one of the data center products and services comprises purchasing the at least one of the data center products and services from the cloud provider entity.

3. The method of claim 1, wherein configuring the obtained one of the data center products and services comprises selecting options associated with the obtained one of the data center products and services.

4. The method of claim 1, wherein managing the configured one of the data center products and services comprises administering the configured one of the data center products and services.

5. The method of claim 1, wherein managing the configured one of the data center products and services comprises monitoring the configured one of the data center products and services.

6. The method of claim 1, wherein the customer-specific application is configured with information associated with one or more of the cloud provider entity and the customer entity.

7. The method of claim 1, wherein the customer-specific application is deployed in a secure container.

8. The method of claim 7, wherein the secure container supports web services.

9. The method of claim 1, wherein the registry performs a recommendation function for the customer entity.

10. The method of claim 9, wherein the recommendation function is based on an introspection of one or more local system sensors, and wherein the recommendation function comprises at least one of a model driven configuration optimization and continuous administration of a system configuration and associated data center assets.

11. A computer program product comprising a non-transitory processor-readable storage medium having encoded therein executable code of one or more software programs, wherein the one or more software programs when executed by the processor of the processing device implement the steps of the method of claim 1.

12. The method of claim 1, wherein the customer-specific application is configured with a normalized interface to integrate the customer-specific application with a message bus.

13. The method of claim 12, wherein the message bus sends control messages between the customer-specific application and the registry.

14. An apparatus comprising:
a memory; and
a processor operatively coupled to the memory and configured to:
  maintain a registry corresponding to at least one of products and services offered by a cloud provider entity for use in providing a data center for a customer entity, the data center comprising a plurality of cloud computing resources connected over a network;
  provide a central interface for presenting information maintained in the registry and for presenting one or more features operative to allow the customer entity to at least one of create and change a configuration of the data center, wherein the customer entity, through the central interface, is enabled to: obtain at least one of the data center products and services, configure the obtained one of the data center products and services, and manage the configured one of the data center products and services, such that the customer obtains a customized data center configuration through the central interface and the registry;
  form a customer-specific application that implements at least a portion of the configuration of the data center of the customer entity, wherein the customer-specific application is configured with logic specific to the customer entity, wherein the registry comprises one or more application templates each comprising at least one application programming interface for one or more customer devices running the customer-specific application, wherein forming the customer-specific application comprises employing the one or more application templates, and wherein the customer-specific application is automatically deployed by the registry; and
  integrate the customer-specific application with one or more other data center products and services that exist in the configuration of the data center of the customer entity;
  wherein the integrating comprises inserting the logic into the existing one or more other data center products and services.

15. The apparatus of claim 14, wherein the customer-specific application is deployed in a secure container that supports web services.

16. The apparatus of claim 14, wherein the customer-specific application is configured with a normalized interface to integrate the customer-specific application with a message bus.

17. The apparatus of claim 16, wherein the message bus sends control messages between the customer-specific application and the registry.

18. A system comprising:
a registry corresponding to at least one of products and services offered by a cloud provider entity for use in providing a data center for a customer entity, the data center comprising a plurality of cloud computing resources connected over a network; and
a central interface for presenting information maintained in the registry and for presenting one or more features operative to allow the customer entity to at least one of create and change a configuration of the data center, the central interface being implemented by at least one processing device;
wherein the customer entity, through the central interface, is enabled to: obtain at least one of the data center products and services, configure the obtained one of the data center products and services, and manage the configured one of the data center products and services, such that the customer obtains a customized data center configuration through the central interface and the registry, which is accessible via a secure service application;
wherein a customer-specific application that implements at least a portion of the configuration of the data center of the customer entity is formed through the registry;
wherein the customer-specific application is configured with logic specific to the customer entity;
wherein the registry comprises one or more application templates each comprising at least one application programming interface for one or more customer devices running the customer-specific application, wherein forming the customer-specific application comprises employing the one or more application templates, and wherein the customer-specific application is automatically deployed by the registry;
wherein the customer-specific application is integrated with one or more other data center products and services that exist in the configuration of the data center of the customer entity; and
wherein the integrating comprises inserting the logic into the existing one or more other data center products and services.

* * * * *